United States Patent [19]
Monzaki et al.

[11] Patent Number: 5,782,543
[45] Date of Patent: Jul. 21, 1998

[54] STABILITY CONTROL DEVICE OF VEHICLE COMPATIBLE WITH FOOT BRAKING

[75] Inventors: Shirou Monzaki, Mishima; Mizuho Sugiyama, Toyota, both of Japan

[73] Assignee: Toyota Jidosha Kabushiki Kaisha, Toyota, Japan

[21] Appl. No.: 726,412

[22] Filed: Oct. 3, 1996

[30] Foreign Application Priority Data

Oct. 11, 1995 [JP] Japan .................. 7-289334

[51] Int. Cl.$^6$ .................................................... B60T 8/32
[52] U.S. Cl. .................. 303/146; 303/140; 303/147; 180/197
[58] Field of Search .................. 303/140, 121, 303/146–147, 148, 160, 143, 190, 139, 169, 173–176, 189, 195, 196, 199, 159, 125, 123, 113.2, 113.4, 155; 364/426.042, 426.016; 188/181 C, 181 A; 180/197; 701/72, 73, 94

[56] References Cited

U.S. PATENT DOCUMENTS

| | | | |
|---|---|---|---|
| 4,509,802 | 4/1985 | Solleder et al. | 303/139 |
| 4,733,760 | 3/1988 | Inagaki et al. | 303/113.2 |
| 5,188,434 | 2/1993 | Ruf et al. | |
| 5,206,808 | 4/1993 | Inoue et al. | 364/426.016 |
| 5,341,297 | 8/1994 | Zomotor et al. | 364/426.016 |
| 5,403,076 | 4/1995 | Altmann et al. | 303/125 |
| 5,560,690 | 10/1996 | Hattori et al. | 303/146 |
| 5,620,239 | 4/1997 | Mihara et al | 303/121 |
| 5,640,324 | 6/1997 | Inagaki | 180/197 |
| 5,645,326 | 7/1997 | Sano | 303/140 |

FOREIGN PATENT DOCUMENTS

A-6-24304  2/1994  Japan .

*Primary Examiner*—Douglas C. Butler
*Attorney, Agent, or Firm*—Oliff & Berridge PLC

[57] ABSTRACT

A stability control device for a vehicle is shown that estimates a liability of a vehicle body to drift-out in order to produce a drift-out quantity that generally increases along with the increase of the drift-out liability. A brake device selectively applies a variable braking force to each wheel, with the brake device including a manually controlled pressure source having a brake pedal and an accumulator pressure source. A controller controls the brake device according to the drift-out quantity so as to variably apply a braking force to a selected wheel for suppressing the vehicle body against drifting out. The controller controls the brake device by employing the manually controlled pressure source when the brake pedal is substantially stepped on, while employing the accumulator pressure source when the brake pedal is not substantially stepped on. The use of the manually controlled pressure source may also be conditioned upon a friction coefficient of a road surface not being greater than a predetermined threshold value.

2 Claims, 6 Drawing Sheets

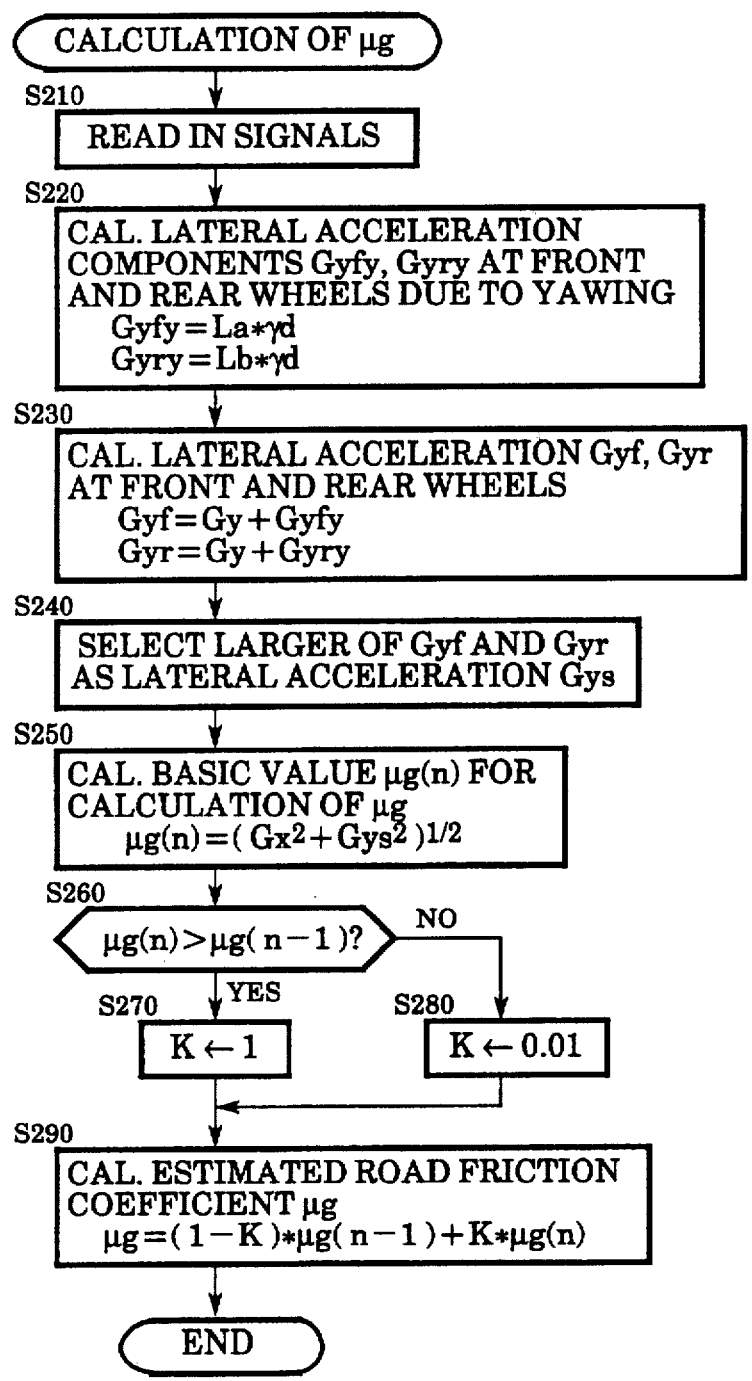

STABILITY CONTROL DEVICE OF VEHICLE COMPATIBLE WITH FOOT BRAKING

BACKGROUND OF THE INVENTION

1. Field of the Invention

The present invention relates generally to a behavior control of a vehicle such as an automobile for improving the driving stability thereof, and more particularly, to a stability control device compatible with foot braking operated by the driver.

2. Description of the Prior Art

It is well know that the automobiles or the like vehicle, are when unduly driven through a curved road or a corner, liable to "drift-out" as a phenomenon of instability that the front wheels slide outside of the turn under saturation of the tire grip force of the front wheels, because the side force applied to the vehicle body as a centrifugal force can increase with no limit along with increase of vehicle speed and steering angle, while the tire grip force for holding the vehicle body from the road surface is limited, particularly to be less on a slippery wet road.

Various endeavors have been made to suppress the automobiles and the like vehicles against spin and/or drift-out. An example is shown in Japanese Patent Laid-open Publication 6-24304, according to which controlled braking forces are applied to respective wheels by a feedback control system such that the actual yaw rate of the vehicle body conforms to a target yaw rate calculated based upon running conditions of the vehicle including steering condition.

In similar endeavors for further improving the vehicle behavior particularly against the drift-out, the present inventors have noted the following:

As well known in the art, the drift-out is effectively suppressed by braking the vehicle, particularly at the rear wheels, so that the vehicle is decelerated to decrease the centrifugal force applied thereto, and further, when the rear wheels are braked, the lateral vector component of the tire grip force of the rear wheels is decreased by an addition of a longitudinal vector component generated by the braking, as the total vector of the tire grip force available is limited and saturates in all directions, thereby allowing the rear wheels to slip outside of the turn, thus forwarding the running vehicle toward inside of the turn.

However, the drift-out is often sensed or estimated by drivers, much more definitely when they are highly skilled in the driving, and it is considered to be more desirable that such an automatic drift-out control is carried out by paying respect to the driver's operation, such as only partially to modify the driver's braking operation, as the drivers should always be convinced that the vehicles are under their control.

Further, in the control of the drift-out which is closely related with the friction coefficient of the road surface, there is a situation that, although said coefficient can be estimated by calculations based upon the longitudinal and lateral accelerations of the vehicle detectable by measuring means, there is a difficulty in highly correctly estimating it all along the road except when the road surface is specially and uniformly finished to have a high friction coefficient. In a gray zone of the surface condition, the driver's judgment should be more appreciated.

SUMMARY OF THE INVENTION

In view of the above matters, it is an object of the present invention to provide a stability control device of a vehicle which is fundamentally based upon an automatic braking according to a computer control but incorporates the driver's manual braking operation for the drift-out control, so as more desirably to accomplish the drift-out suppress control of the vehicle.

In order to accomplish the above-mentioned object, the present application proposes a stability control device of a vehicle having a vehicle body, and front left, front right, rear left and rear right wheels, comprising:

a means for estimating a liability of the vehicle body to drift-out for producing a drift-out quantity which generally increases along with increase of the drift-out liability;

a brake means for selectively applying a variable braking force to each of said wheels, said brake means including a manually controlled pressure source means having a brake pedal and an accumulator pressure source means; and a control means for controlling said brake means according to said drift-out quantity so as variably to apply a braking force to a selected one or ones of said wheels for suppressing the vehicle body against drift-out, wherein said control means controls said brake means by employing said manually controlled pressure source means when said brake pedal is substantially stepped on, while otherwise employing said accumulator pressure source means.

Further, in view of the above-mentioned particular situation concerned with the estimation of the friction coefficient of road surface, the stability control device according to the present invention may be so modified that said control means employs said manually controlled pressure source means when said brake pedal is substantially stepped on, and friction coefficient of a road surface is not greater than a predetermined threshold value.

BRIEF DESCRIPTION OF THE DRAWING

In the accompanying drawing,

FIG. 7 is a flowchart showing a road surface friction coefficient calculation routine.

DESCRIPTION OF THE EMBODIMENTS

In the following, the present invention will be described in more detail in the form of a preferred embodiment with reference to the accompanying drawings.

Figure 1:
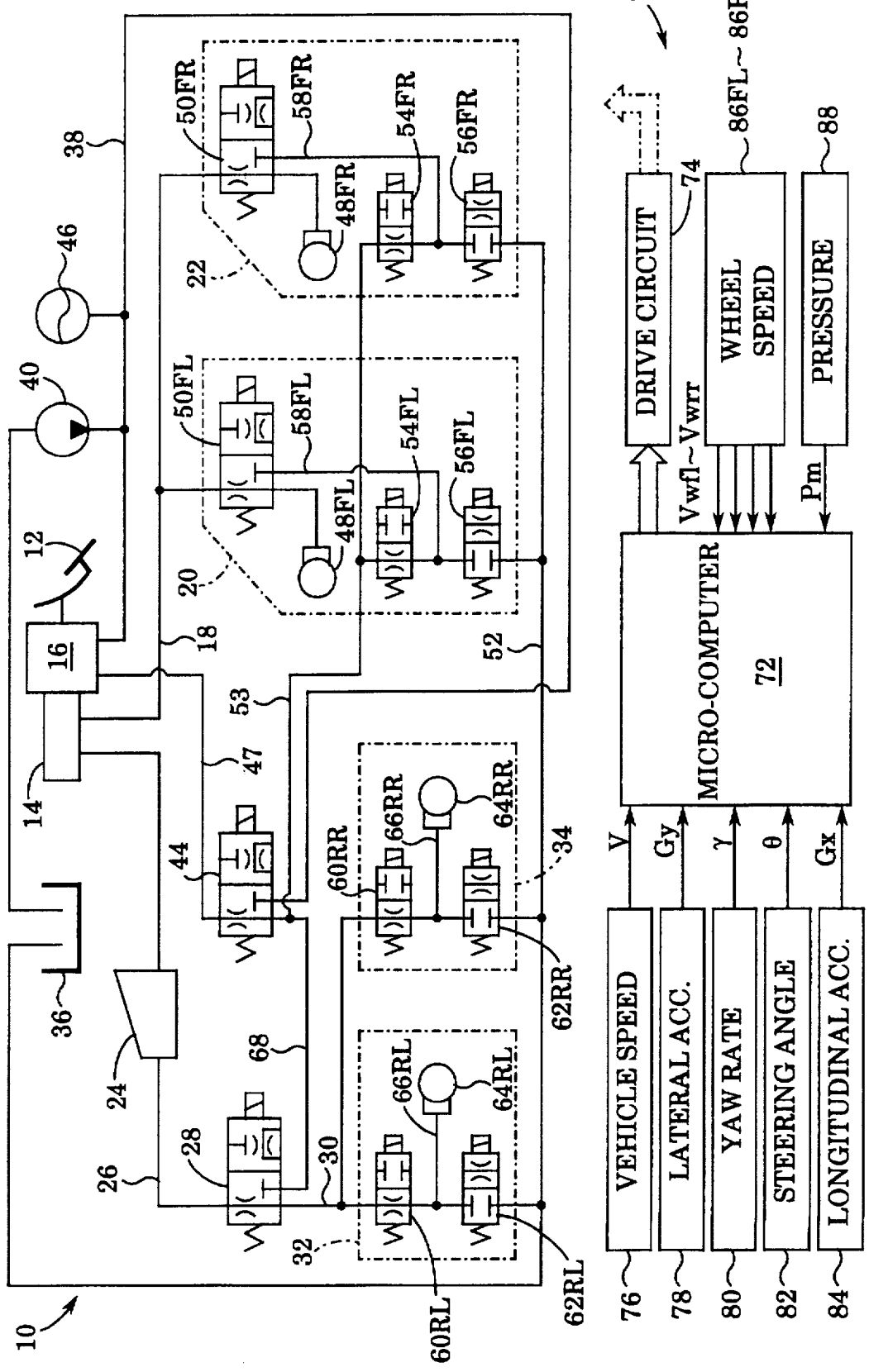
FIG. 1 is a diagrammatic illustration of hydraulic circuit means and electrical control means of an embodiment of the stability control device according to the present invention.

First, referring to FIG. 1 showing diagrammatically an embodiment of the behavior control device of the present invention with regard to the constructions of its hydraulic circuit means and its electric control means, the hydraulic circuit means generally designated by 10 comprises a conventional manual brake pressure source means including a brake pedal 12 to be stepped on by a driver, a master cylinder 14 adapted to generate a master cylinder pressure according to the stepping-on of the brake pedal 12, and a hydro-booster 16 which generates a booster pressure.

The hydraulic means 10 further comprises a powered brake pressure source means including a reservoir 36 and a brake fluid pump 40 which delivers a pressurized brake fluid to a passage 38 to which an accumulator 46 is connected, so that a stabilized accumulator pressure for the automatic brake control described hereinbelow is available in the passage 38. The accumulator pressure is also supplied to the hydro-booster 16 as a pressure source for generating a booster pressure which has substantially the same pressure performance as the master cylinder pressure depending upon the stepping-on performance of the brake pedal 12 but is capable to maintain such a pressure performance while the brake fluid is being consumed by a series connection of a normally open type on-off valve and a normally closed type on-off valve to obtain a desired brake pressure, as described hereinbelow.

A first passage 18 extends from a first port of the master cylinder 14 to a front left wheel brake pressure control means 20 and a front right wheel brake pressure control means 22. A second passage 26, including in its way a proportioning valve 24, extends from a second port of the master cylinder 14 toward both of a rear left wheel brake pressure control means 32 and a rear right wheel brake pressure control means 34, via a 3-ports-2-positions changeover type electromagnetic control valve 28, an outlet port of which is connected, via a common passage 30, with the rear left and right wheel brake pressure control means 32 and 34.

The brake pressure control means 20 and 22 of the front left and front right wheels include wheel cylinders 48FL and 48FR for applying variable braking forces to the front left and front right wheels, 3-ports-2-positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being connected between a passage 53 adapted to be supplied with the accumulator pressure of the passage 38 or the booster pressure from the hydro-booster through a 3-ports-2-positions changeover type electronic control valve 44 the operation of which is described hereinbelow, and a return passage 52 connected to the reservoir 36. A mid point of the series connection of the on-off valves 54FL and 56FL is connected to a port of the control valve 50FL by a connection passage 58FL, and a mid point of the series connection of the on-off valves 54FR and 56FR is connected to a port of the control valve 50FR by a connection passage 58FR.

The brake pressure control means 32 and 34 of the rear left and rear right wheels include wheel cylinders 64RL and 64RR for applying braking force to the rear left and rear right wheels, respectively, and series connections of normally open type electromagnetic on-off valves 60RL and 60RR and normally closed type electromagnetic on-off valves 62RL and 62RR, said series connections of normally open type on-off valves and the normally closed type on-off valves being connected between the passage 30 connected to the one outlet port of the control valve 28 and the return passage 52. A mid point of the series connection of the on-off valves 60RL and 62RL is connected to a wheel cylinder 64RL for applying braking force to the rear left wheel by a connection passage 66RL, and a mid point of the series connection of the on-off valves 60RR and 62RR is connected to a wheel cylinder 64RR for applying braking force to the rear right wheel by a connection passage 66RR.

The control valves 50FL and 50FR are respectively switched over between a first position for connecting the wheel cylinders 48FL and 48FR with the manual brake pressure passage 18, while disconnecting them from the connection passages 58FL and 58FR, respectively, as in the state shown in the figure, and a second position for disconnecting the wheel cylinders 48FL and 48FR from the passage 18, while connecting them with the connection passages 58FL and 58FR, respectively.

The control valve 28 is switched over between a first position for connecting the passage 30 for both of the series connection of the on-off valves 60RL and 62RL and the series connection of the on-off valves 60RR and 62RR with the manual brake pressure passage 26 as in the state shown in the figure, and a second position for disconnecting the passage 30 from the passage 26, while connecting it with a passage 68 connected to one outlet port of the changeover control valve 44 together with the passage 53, so as to be connected with either a delivery port of the hydro-booster 16 or the accumulator pressure passage 38, according to whether the control valve 44 is in a first position such as shown in the figure or a second position opposite thereto.

When the control valves 50FL, 50FR and 28 are in the first position as in the state shown in the figure, the wheel cylinders 48FL, 48FR, 64RL, 64RR are connected with the manual brake pressure passages 18 and 26 so as to be supplied with the pressure of the master cylinder 14 to the respective wheel cylinders, thereby enabling the driver to apply a braking force to each wheel according to the stepping-on of the brake pedal 12. When the control valve 28 is changed over to the second position, with the control valve 44 being kept at the shown first position, the rear wheel cylinders 64RL and 64RR are supplied with the booster pressure according to the stepping-on of the brake pedal from the hydro-booster 16. When the control valves 50FL, 50FR, 28 and 44 are changed over to the second position, the wheel cylinders 48FL, 48FR, 64RL, 64RR are supplied with the accumulator brake pressure of the passage 38 under the control of the normally open on-off valves 54FL, 54FR, 60RL, 60RR and the normally closed type on-off valves 56FL, 56FR, 62RL, 62RR according to the ratio of the open state of the corresponding normally open type on-off valve and the closed state of the corresponding normally closed type on-off valve, i.e. the so-called duty ratio, apart from the stepping-on of the brake pedal 12.

The changeover control valves 50FL, 50FR, 28, 44, normally open type on-off valves 54FL, 54FR, 60RL, 60RR, normally closed type on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate $\gamma$ of the vehicle body from a yaw rate sensor 80, a signal showing steering angle θ from a steering angle sensor 82, a signal showing longitudinal acceleration Gx of the vehicle body from a longitudinal acceleration sensor 84 mounted substantially at the mass center of the vehicle body, signals showing wheel speed (wheel circumferential speed) Vwfl, Vwfr, Vwrl, Vwrr of front left and right wheels and rear left and right wheels not shown in the figure from wheel speed sensors 86FL–86RR, respectively, and the pressure Pm of the master cylinder 14 from a pressure sensor 88. The lateral acceleration sensor 78, yaw rate sensor 80 and steering angle sensor 82 detect the lateral acceleration, yaw rate and steering angle, respectively, as being positive when the vehicle makes a left turn, and the longitudinal acceleration sensor 84 detects longitudinal acceleration as being positive when the vehicle is accelerated in the forward direction. In general, in the following analyses, the parameters which are distinctive of the direction of turn of the vehicles are each assumed to be positive when the turn is counter-clockwise and negative when the turn is clockwise, as viewed from the top of the vehicle.

Figure 3:
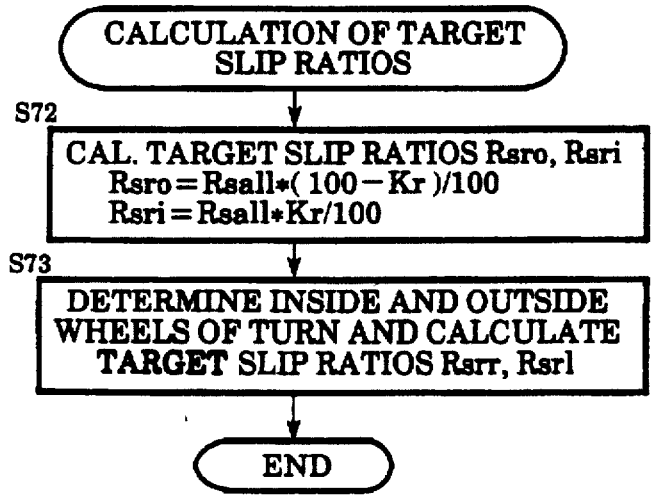
FIG. 3 is a flowchart showing a target slip ratio calculation step included in the routine of FIG. 2 in more detail.
Figure 4:
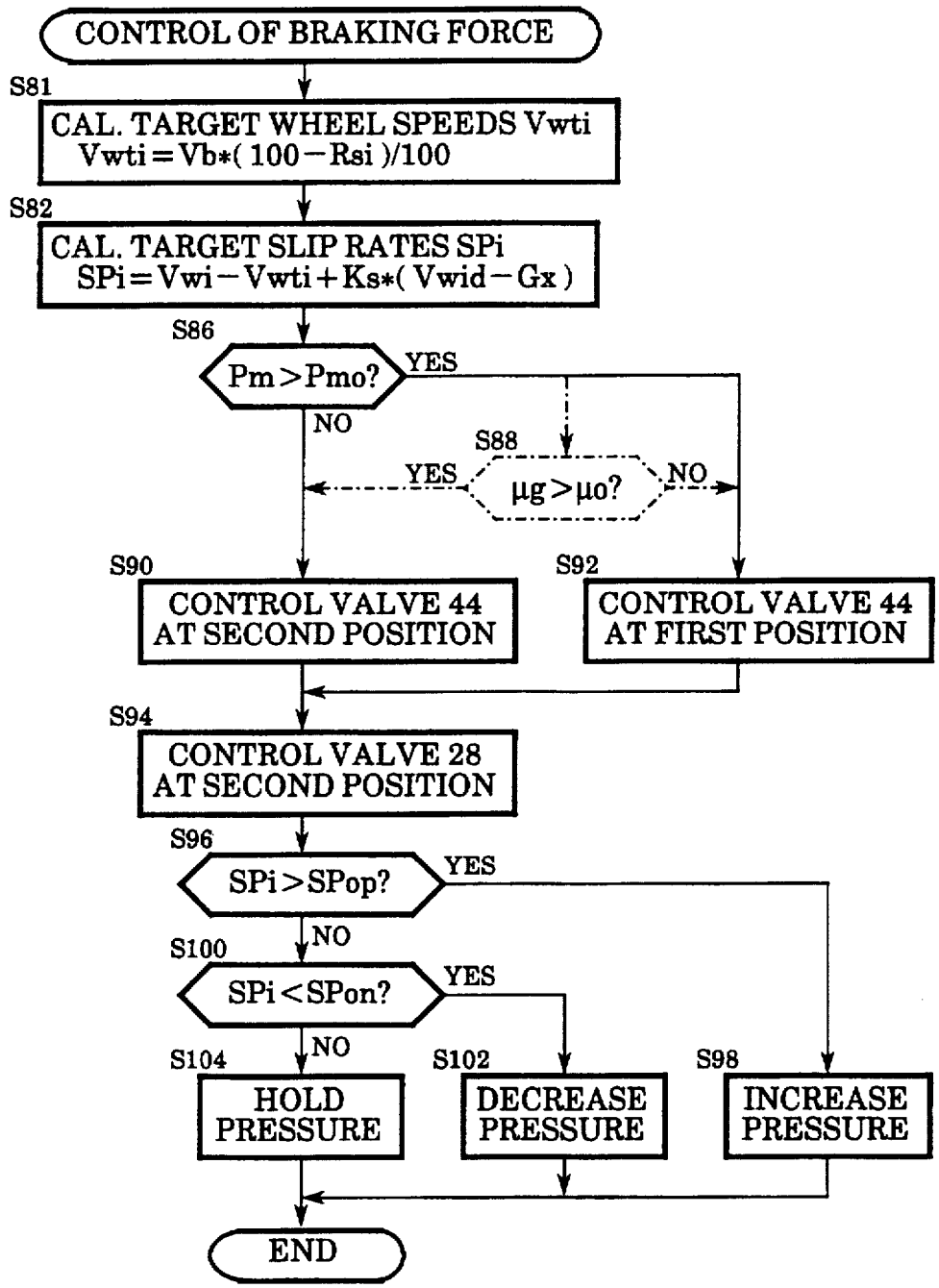
FIG. 4 is a flowchart showing a braking force control step included in the routine of FIG. 2 in more detail.
Figure 5:
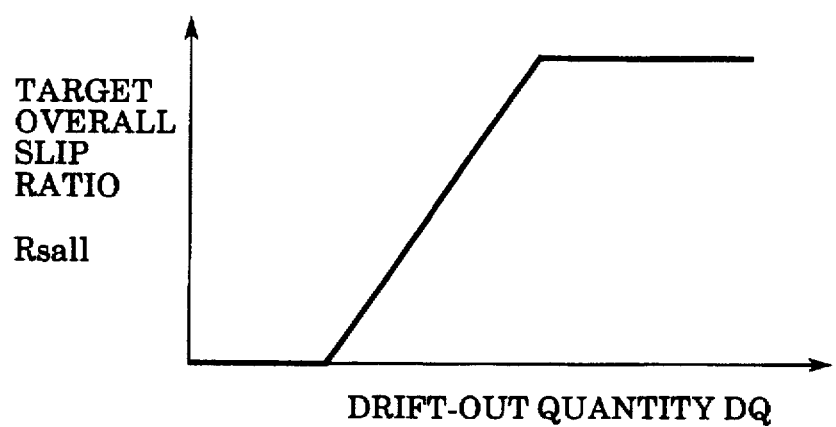
FIG. 5 is a map showing the relationship between the drift-out quantity DQ and the target overall slip ratio Rsall.

The read only memory of the micro-computer 72 stores such flowcharts as shown in FIGS. 2, 3, 4 and 7 and such a maps as shown in FIG. 5. The central processing unit conducts various calculations based upon the parameters detected by the above-mentioned various sensors according to those flowcharts and maps as described hereinbelow, so as to obtain the spin quantity and the drift-out quantity for judging and estimating spinning state and drifting out state of the vehicle, respectively, and controls the turn behavior of the vehicle based upon the estimated quantities, particularly to suppress the vehicle from spinning and drifting out, by selectively applying a variable braking force to each of the wheels.

Figure 2:
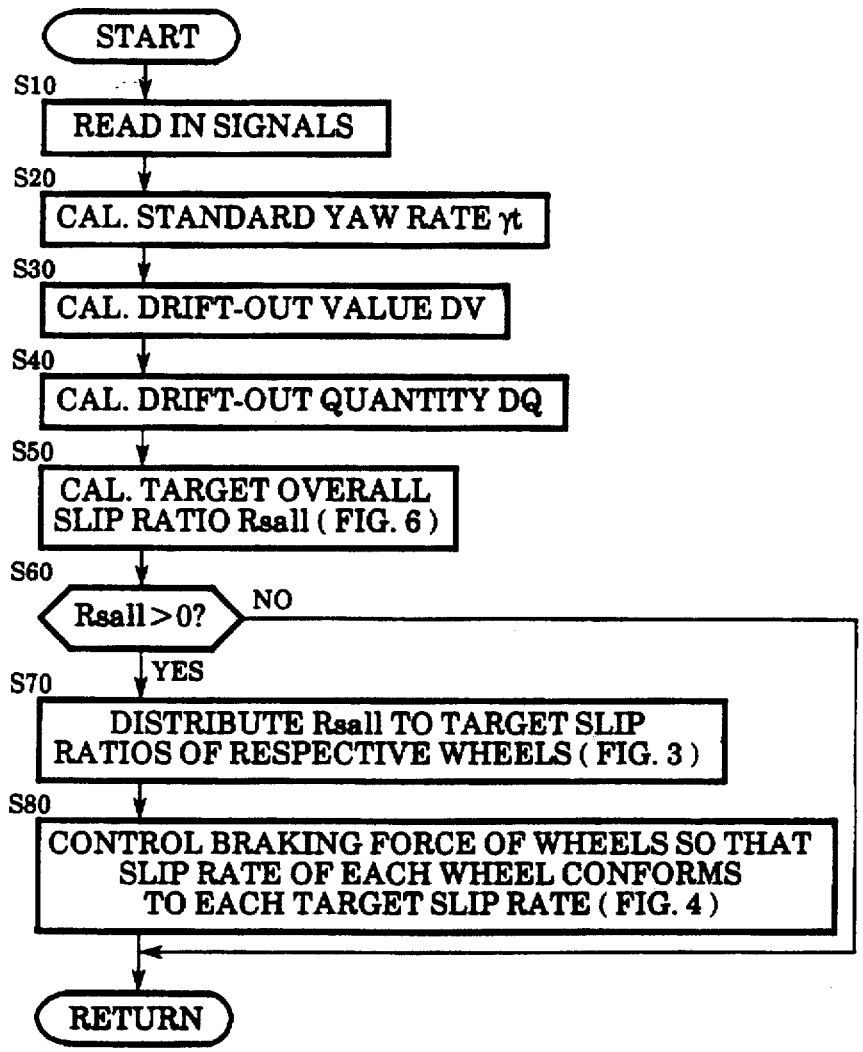
FIG. 2 is a flowchart showing an embodiment of the stability control routine conducted by the device of the present invention.

In the following, the stability control device of the present invention will be described in the form of an embodiment of its control operation with reference to FIGS. 2–4. The control according to the flowcharts of FIGS. 2–5 is started by a closure of an ignition switch not shown in the figure and carried out repetitively at a predetermined time interval such as tens of microseconds.

In step 10, the signals including vehicle speed V from the vehicle speed sensor 76 and others are read in. In step 20, a target yaw rate γc is calculated according to the following formula 1, wherein H is the wheel base and Kh is an appropriate stability factor:

$$\gamma c = V * \theta / (1 + Kh * V^2) * H \tag{1}$$

The calculation of the target yaw rate γc may be modified to incorporate the lateral acceleration Gy of the vehicle body. Then, by employing the Laplace operator s and an appropriate time constant T therefor, a standard yaw rate γt is calculated according to the following formula 2:

$$\gamma t = \gamma c / (1 + T * s) \tag{2}$$

In step 30, a value herein called drift-out value DV is calculated according to the following formula 3 or 4, the latter being modified by the ratio of wheel base H to vehicle speed V:

$$DV = (\gamma t - \gamma) \tag{3}$$

$$DV = H * (\gamma t - \gamma) / V \tag{4}$$

In step 40, based upon the judgment of the direction of turn of the vehicle based upon the sign of the yaw rate γ, a parameter herein called drift-out quantity DQ is determined such that DQ=DV when the vehicle is making a left turn, while DQ=–DV when the vehicle is making a right turn. Then, referring to a map such as shown in FIG. 5, a target overall slip ratio Rsall is read out to correspond to a current drift-out quantity DQ.

In step 60, it is judge if the target overall slip ratio Rsall is positive or not, i.e. if the drift-out quantity DQ is greater than a threshold value appropriately determined therefor. When the answer is no, the control returns to step 10, whereas when the answer is yes, the control proceeds to step 70, where the target overall slip ratio Rsall is distributed to the rear left and real right wheels, as shown in more detail in FIG. 3. Referring to FIG. 3, in step 72, a target slip ratio Rsro for a rear wheel at the outside of the turn and a target slip ratio Rsri for a rear wheel at the inside of the turn are calculated as follows by employing an appropriate distribution factor Kr:

$$Rsro = Rsall * (100 - Kr)/100 \tag{5}$$

$$Rsri = Rsall * Kr/100 \tag{6}$$

In step 73, according to the direction of turn of the vehicle judged from the sign of the yaw rate γ, the rear wheels at the outside and the inside of the turn are determined. When the vehicle is making a left turn, the target slip ratios Rsrl and Rsrr for the rear left and rear right wheels are determined according to the following formulae 7, whereas when the vehicle is making a right turn, the target slip ratios Rsrl and Rsrr of the rear left and rear right wheels are determined according to the following formulae 8:

$$Rsrl = Rsri$$
$$Rsrr = Rsro \tag{7}$$

$$Rsrl = Rsro$$
$$Rsrr = Rsri \tag{8}$$

In step 80 of FIG. 2, the braking forces applied to the rear left and rear right wheels are controlled according to the steps shown in more detail in FIG. 4, so that the slip ratios of the rear left and rear right wheels conform to the respective target slip ratios.

Referring to FIG. 4, in step 81, target wheel speeds Vwti (i=rl, rr) of the rear left and rear right wheels are calculated, based upon a reference vehicle speed Vb such as that of a front wheel at the inside of the turn, according to the following formula 9:

$$Vwti = Vb * (100 - Rsi)/100 \tag{9}$$

In step 82, taking Vwid as wheel acceleration of each wheel (differentiation of Vwi) and Ks as an appropriate positive constant, slip rates SPi (i=rl, rr) of the rear left and rear right wheels are calculated according to the following formula 10:

$$SPi = Vwi - Vwti + Ks * (Vwid - Gx) \tag{10}$$

In step 86, it is judged if the pressure Pm of the master cylinder 14 is greater than a threshold value Pmo determined therefor (a positive constant), i.e., if the driver is substantially stepping on the brake pedal 12. If the answer is no, i.e. if the driver is not substantially stepping on the brake pedal, the process proceeds to step 90, where the changeover control valve 44 is positioned at the second position thereof so that the rear brakes pressure control means 32 and 34 are supplied with the accumulator pressure of the passage 38, as the changeover control valve 28 is changed over to the second position in the following step 94. On the other hand, if the answer of step 86 is yes, i.e. the driver is substantially stepping on the brake pedal, the control proceeds to step 92, where the control valve 44 is positioned at the first position, so that the rear brake pressure control means 32 and 34 are operated with the boosted pressure available in the passage 47 according to the stepping-on of the brake pedal by the driver. In either case, in the next step 94, the control valve 28 is changed over to the second position. Step 88 and the process lines concerned therewith show a modification which is described hereinbelow.

In step 96, it is judged if SPi is greater than an appropriate positive threshold value SPop which may be a relatively small value, and if the answer is yes, the control proceeds to step 98, where the on-off valves 60RL, 62RL, 60RR, 62RR are controlled to increase the hydraulic pressure supplied to the wheel cylinders 64RL and 64RR, so as to newly apply a braking force to the rear wheels or to more increase the braking force already applied to the rear wheels, as a positive value of SPi means that the wheel speed Vwi must be decreased to conform to its target value Vwti.

When the answer of step 96 is no, then in step 100 it is judged if SPi is smaller than a relatively small negative threshold value SPon, i.e., if SPi is a negative value whose absolute value is greater than a relatively small absolute value of SPon, and if the answer is yes, the control proceeds to step 102, where the on-off valves 60RL, 62RL, 60RR, 62RR are controlled to decrease the hydraulic pressure supplied to the wheel cylinders 64RL and 64RR, so as to decrease the braking force already applied to the rear wheels.

When the answer of step 100 is no, the control proceeds to step 104, where the on-off valves 60RL, 62RL, 60RR, 62RR are all kept in the closed condition to hold the pressures of the wheel cylinders 64RL and 64RR unchanged.

Thus, as will be appreciated from steps 86–94, when the driver is not substantially stepping on the brake pedal when the vehicle is making a turn in such a condition that the rear left and rear right wheels are desired to be braked such that the slip rate thereof are approached to the target values calculated in step 82, such a brake control is carried out by employing the accumulator pressure supplied through the passage 38, with the control valve 44 being changed over to the second position, whereas if the driver is substantially stepping on the brake pedal probably with an intention of suppressing the vehicle against drifting out, the automatic drift-out suppress control based upon the target slip ratios SPi is carried out by employing the pressure available from the hydro-booster 16 depending upon the stepping on of the brake pedal by the driver, with the control valve 44 being changed over to the first position, respecting the driver's braking action, while only trimming the booster pressure reflecting the driver's braking operation, for a better modification, if applicable.

Figure 6:
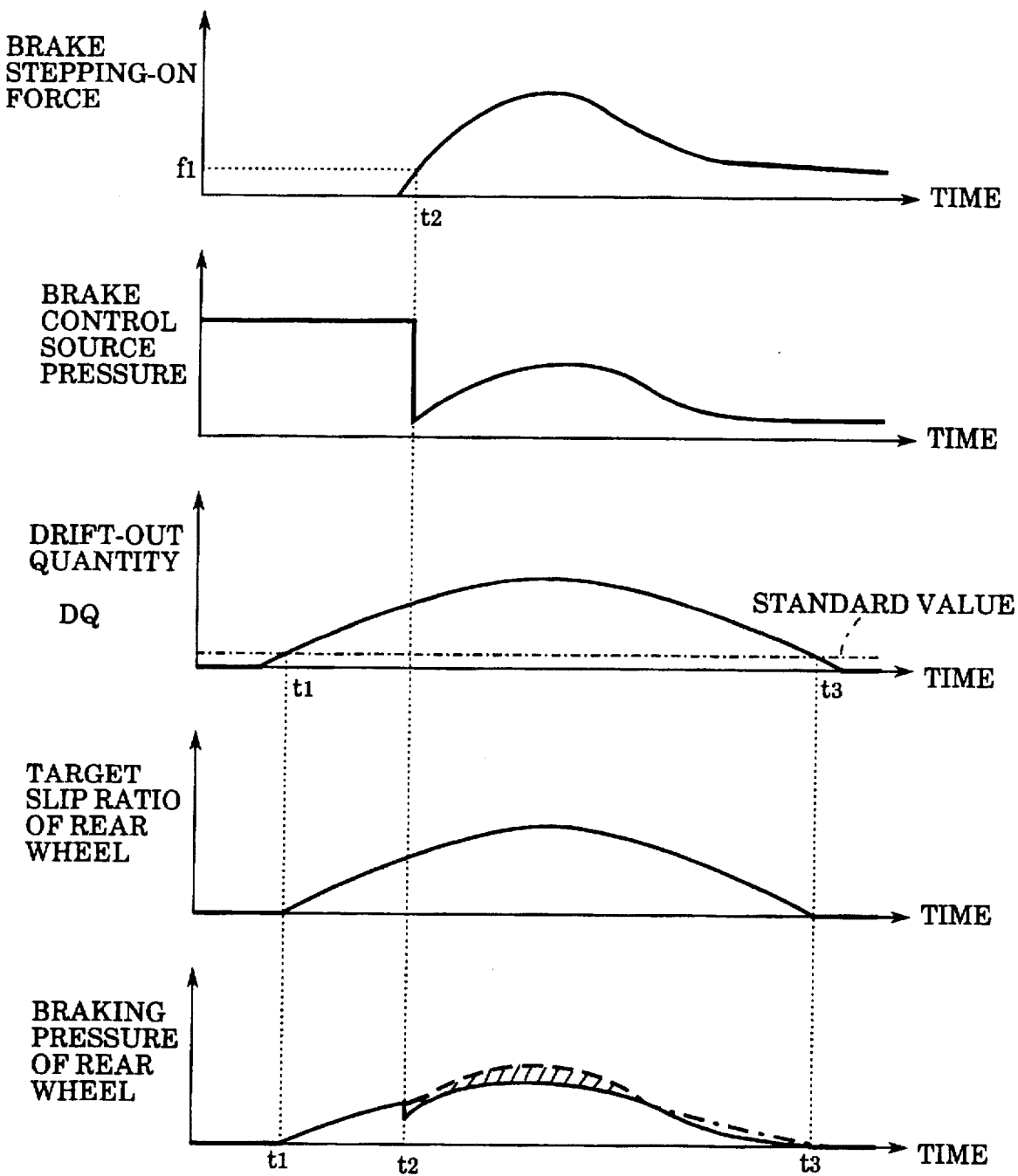
FIG. 6 is a set of graphs showing the performances of the stepping-on force of the foot brake, etc. against the lapse of time.

FIG. 6 shows an example of how the braking pressure of a rear wheel changes when the drift-out suppress control according to the present invention is carried out with the brake pedal being stepped on by the driver. In more detail, assuming that, according to such a change of the drift-out quantity DQ as shown in the third rank of FIG. 6, at time point t1 the drift-out quantity increases to be greater than the threshold level. Starting at this time point, the target slip ratio for the rear wheel is calculated to show such a performance as shown in the fourth rank of FIG. 6. If the brake pedal is not stepped on by the driver, the braking pressure supplied to the rear wheel is generated from the accumulator pressure supplied through the passage 38 which is shown in the starting portion of the graph of the second rank of FIG. 6, so that the braking pressure for the rear wheel is controlled to show a performance curve shown in the fifth rank of FIG. 6 between time points t1 and t2, as would further continue between time point t2 and t3 as shown by a phantom (dot-dash) line. (An intermediate part of the phantom line is overlapped by the solid line which shows the actually applied pressure.) However, when the brake pedal is stepped on by the driver such that the pressure supplied from the booster 16 rises up to pressure f1 at time point t2 and shows such a performance curve as shown in the first rank of FIG. 6, the brake source pressure is changed over at time point t2 from the accumulator pressure of the passage 38 to the booster pressure of the passage 47, such that thereafter the braking pressure supplied to the rear wheel changes as shown by a solid line in the fifth rank of FIG. 6, whereby a peak portion of the booster pressure (shown by the broken line) is trimmed out therefrom (the hatched portion) by the automatic control, while near the end of the braking the automatic braking is not fully effected due to insufficient source pressure available from the booster pressure.

Referring again to FIG. 4, a modification of the embodiment of the present invention described above is shown by step 88 and the related control passes drawn by phantom lines. According to this modification, when it was judged in step 86 that Pm is greater than Pmo, i.e. the driver is substantially stepping on the brake pedal beyond a predetermined threshold value, the control proceeds to step 88, and it is judged if the friction coefficient μg of the road surface, which may be calculated as described hereinbelow with reference to FIG. 7, is greater than a certain threshold value μo. Then, if the answer is yes, the control proceeds to step 90, while if the answer is no, the control proceeds to step 92. According to this modification, if the vehicle is running on a road whose friction coefficient is high enough to highly precisely guarantee the effectiveness of the automatic drift-out suppress control based upon the computer calculation, the drift-out suppress control is carried out by employing the accumulator pressure which is more adaptive than the booster pressure to widely changing performances desired for the brake pressure determined by the computer calculation. In other words, if the road surface is sufficiently frictional, the driver's sensitivity on the gripping ability or slipperiness of the road surface would not be much needed, and the higher adaptivity of the pressure source would be rather preferred.

Referring to FIG. 7, an embodiment of estimating the friction coefficient μg of the road surface will be described. In step 210, the lateral acceleration Gy detected by the lateral acceleration sensor 78 and other needed signals are read in. Then in step 220, the yaw rate γ is differentiated by time to generate its derivative γd, and based thereupon lateral acceleration components Gyfy and Gyry at the positions of the front and rear wheels due to the yawing are calculated according to the following formulae 11, wherein La and Lb are distances between the mass center of the vehicle and front and rear axles, respectively:

$$Gyfy = La * \dot{\gamma}d$$

$$Gyry = Lb * \dot{\gamma}d \quad (11)$$

In step 230, lateral acceleration components Gyf and Gyr of the vehicle body at the positions of the front and rear wheels are calculated according to the following formulae 12 by incorporating the lateral acceleration Gy detected by the lateral acceleration sensor 78:

$$Gyf = Gy + Gyfy$$

$$Gyr = Gy + Gyry \quad (12)$$

Then, in step 240, by selecting a larger one of Gyf and Gyr as Gys, the friction coefficient μg of the road surface is calculated according to the following formula 13, by incorporating the longitudinal acceleration Gx detected by the longitudinal acceleration sensor 84:

$$\mu g = (Gx^2 + Gys^2)^{1/2} \quad (13)$$

In step 260, it is judged if μg (n) calculated at the current computation cycle is greater than μg (n−1) calculated at the proceeding calculation cycle, and if the answer is yes the control proceeds to step 270, whereas if the answer is no the control proceeds to step 280.

In step 270, a factor K is made 1, whereas in step 280 the factor K is made a value substantially smaller than 1, such as, for example, 0.01. Then in step 290, the friction coefficient μg is calculated according to the following formula 14:

$$\mu g = (1-K)*\mu g(n-1) + K*\mu g(n) \quad (14)$$

The processing by the formula 14 provides a screening effect as well known in the art when Gys fluctuates largely between a substantial positive value and a substantial negative value through zero, as in the case where the vehicle is driven along an alternately curved road.

Although the present invention has been described in detail with respect to a particular embodiment thereof and a modification thereof, it will be apparent for those skilled in the art that various modifications are possible with respect to the shown embodiment and modification without departing from the spirit of the present invention.

We claim:

1. A stability control device of a vehicle having a vehicle body, and front left, front right, rear left and rear right wheels, comprising:

a means for estimating a liability of the vehicle body to drift out for producing a drift-out quantity which generally increases along with increase of the drift-out liability;

a brake means for selectively applying a variable braking force to each of said rear left and rear right wheels, said brake means including a manually controlled pressure source means incorporating a brake pedal and an accumulator pressure source means; and a control means for controlling said brake means according to said drift-out quantity so as variably to apply a braking force to a selected one or both of said rear left and rear right wheels for suppressing the vehicle body against drift-out, wherein said control means controls said brake means by employing said manually controlled pressure source means when said brake pedal is depressed equal to or more than a predetermined extent, while employing said accumulator pressure source means when said brake pedal is depressed less than said predetermined extent.

2. A stability control device according to claim 1, wherein said control means employs said manually controlled pressure source means when said brake pedal is substantially stepped on, and friction coefficient of a road surface is not greater than a predetermined threshold value.

* * * * *